US008470735B2

(12) United States Patent
Aosaki et al.

(10) Patent No.: US 8,470,735 B2
(45) Date of Patent: Jun. 25, 2013

(54) COATING SOLUTION FOR HEAT-SENSITIVE COLOR-DEVELOPING LAYER, AND HEAT-SENSITIVE RECORDING MATERIAL

(75) Inventors: Yoshimune Aosaki, Fukuoka (JP); Mai Kaneko, Fukuoka (JP); Katsuto Ohse, Tokyo (JP); Yukiko Sato, Tokyo (JP)

(73) Assignees: Nippon Paper Industries Co., Ltd., Tokyo (JP); API Corporation, Osaka (JP)

( * ) Notice: Subject to any disclaimer, the term of this patent is extended or adjusted under 35 U.S.C. 154(b) by 0 days.

(21) Appl. No.: 13/262,701

(22) PCT Filed: Apr. 2, 2010

(86) PCT No.: PCT/JP2010/056095

§ 371 (c)(1), (2), (4) Date: Nov. 16, 2011

(87) PCT Pub. No.: WO2010/114130

PCT Pub. Date: Oct. 7, 2010

(65) Prior Publication Data

US 2012/0157303 A1 Jun. 21, 2012

(30) Foreign Application Priority Data

Apr. 3, 2009 (JP) ................................ 2009-091569

(51) Int. Cl.

| | |
|---|---|
| ***B41M 5/333*** | (2006.01) |
| ***B41M 5/337*** | (2006.01) |
| ***C09D 11/00*** | (2006.01) |

(52) U.S. Cl.

USPC ........................ 503/216; 106/31.18; 503/207

(58) Field of Classification Search

None

See application file for complete search history.

(56) References Cited

U.S. PATENT DOCUMENTS

| | | | | |
|---|---|---|---|---|
| 5,110,786 | A | 5/1992 | Arai et al. | |
| 5,801,288 | A * | 9/1998 | Fujii et al. | 568/33 |
| 7,135,431 | B2 * | 11/2006 | Iwasaki et al. | 503/209 |

FOREIGN PATENT DOCUMENTS

| | | |
|---|---|---|
| EP | 1 186 437 | 3/2002 |
| EP | 1 473 170 | 11/2004 |
| JP | 6-127124 | 5/1994 |
| JP | 8-333329 | 12/1996 |
| JP | 2003-212841 | 7/2003 |
| JP | 2004-50648 | 2/2004 |

OTHER PUBLICATIONS

International Search Report issued Jun. 1, 2010 in International (PCT) Application No. PCT/JP2010/056095.

Supplementary European Search Report completed Nov. 5, 2012 in corresponding European Application No. 10 75 8897.

* cited by examiner

*Primary Examiner* — Bruce H Hess

(74) *Attorney, Agent, or Firm* — Wenderoth, Lind & Ponack, L.L.P.

(57) ABSTRACT

Provided are a coating solution for a thermosensitive color developing layer of excellent storability wherein color development during its storage or during producing a thermal recording material is suppressed, and a thermal recording material with excellent print portion (image portion) storability and suppressed staining in the background color (white background).

A coating solution for a thermosensitive color developing layer, which comprises a colorless or pale-colored electron-donating leuco dye, a hindered phenol compound and, as an electron-accepting developer, a diphenylsulfone derivative represented by the following formula (1):

(1)

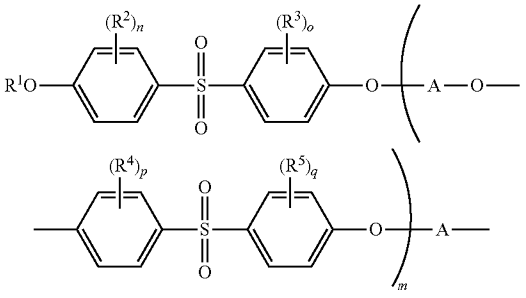

-continued

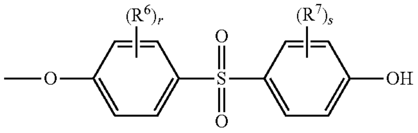

wherein the aforementioned hindered phenol compound has an average particle size (D50) of not more than 0.5 μm, and the coating solution has a color tone a* of not less than −4.0 as measured according to JIS Z 8729 and a whiteness W of not less than 62 as measured according to JIS Z 8715.

10 Claims, 3 Drawing Sheets

COATING SOLUTION FOR HEAT-SENSITIVE COLOR-DEVELOPING LAYER, AND HEAT-SENSITIVE RECORDING MATERIAL

This application is a U.S. national stage of International Application No. PCT/JP2010/056095 filed Apr. 2, 2010.

TECHNICAL FIELD

The present invention relates to a thermal recording material utilizing a color developing reaction of an electron-donating leuco dye with an electron-accepting developer and a coating solution for a thermosensitive color developing layer, which is used for the production of the recording material.

BACKGROUND ART

Generally, thermal recording materials having a thermosensitive color developing layer based mainly on a colorless or pale-colored electron-donating leuco dye (hereinafter also simply referred to as "dye") and an electron-accepting developer (hereinafter also simply referred to as "developer") that reacts with the dye to develop a color upon heating are widely used in practical applications. Image (information) recording on such a thermal recording material is usually achieved by heating a portion to be imaged on the thermosensitive color developing layer using a thermal head. This method of thermal recording is advantageous over other conventionally known methods of recording, with features such as noiselessness during recording, obviation of the need for development and fixation, freedom from maintenance work, relatively inexpensive instrumentation, compactness, and very vivid colors developing in the images obtained, and is widely employed for facsimiles, computer terminal printers, automated ticket machines, measurement recorders, handy terminals for outdoor use, and the like. Also, thermal recording materials are coming to be used not only for output paper for these various devices, but also for betting ticket paper and the like, which are required to have high storability.

When thermal recording materials are used for various tickets, receipts, labels, bank ATM output paper (sheets), gas, electricity and tap water meter reading output paper (sheets), bicycle race, horserace and other betting tickets, and the like, there is a demand for plasticizer resistance and oil resistance that ensure freedom from problems with print portion readability even during storage in contact with plastic films, synthetic leather and the like for a long time, and for color fastness to light and heat resistance that prevent recorded images from discoloring even when exposed to sunlight for a long time. Disclosed for this reason are thermal recording materials incorporating a particular diphenylsulfone derivative as a developer added to improve print portion storability in terms of plasticizer resistance, oil resistance, heat resistance and the like (Patent Documents 1 and 2).

[Document List]

[Patent Documents]

patent document 1: JP-A-2003-212841 patent document 2: JP-A-H08-333329

SUMMARY OF THE INVENTION

Problems to be Solved by the Invention

However, such thermal recording materials incorporating a particular diphenylsulfone derivative as a developer have been problematic in that although their color-developing sensitivity and print portion (image portion) storability are excellent, a coating solution for a thermosensitive color developing layer develops a color and gets stained during their production or during storage of the coating solution, resulting in staining in the white background portion of the produced thermal recording material, which in turn deteriorates the appearance and generally reduces the brightness difference between the print portion and the white background portion, thus interfering with printed information readability and barcode readability.

Therefore, problems to be solved by the present invention concern providing a coating solution for a thermosensitive color developing layer of excellent storability wherein color development during its storage or during producing a thermal recording material is suppressed even when using the above-described particular diphenylsulfone derivative as a developer, and providing a thermal recording material with excellent print portion (image portion) storability and suppressed staining in the background color (white background).

Means of Solving the Problems

The present inventors conducted extensive investigations to solve the above-described problems, found that when preparing a coating solution for a thermosensitive color developing layer by blending a hindered phenol compound and a particular diphenylphenylsulfone derivative (diphenylsulfone derivative represented by the general formula (1) below) as a developer, the coating solution is unlikely to get stained during storage, and the thermosensitive color developing layer formed by applying the coating solution is also unlikely to get stained, and have developed the present invention on the basis of this finding.

Accordingly, the present invention relates to

[1] a coating solution for a thermosensitive color developing layer, which comprises a colorless or pale-colored electron-donating leuco dye, a hindered phenol compound and, as an electron-accepting developer, a diphenylsulfone derivative represented by the following formula (1):

(1)

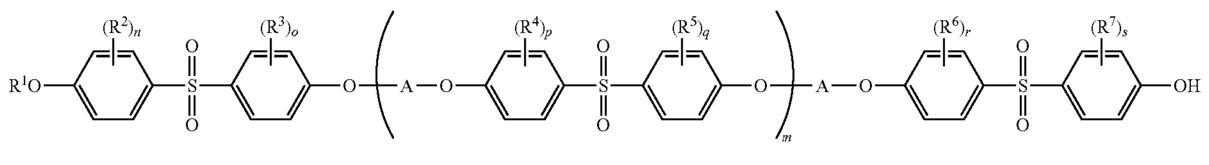

wherein $R^1$ is a linear or branched, saturated or unsaturated hydrocarbon group having a carbon number of 1-12, $R^2$- $R^7$ are each independently a halogen atom, or an alkyl group or alkenyl group having a carbon number of 1-12, n, o, p, q, r and s are each an integer of 0-4, m is an integer of 0-5, and each A is independently a linear or branched, saturated or unsaturated hydrocarbon group having a carbon number of 1-12 and optionally having an ether bond, wherein the aforementioned hindered phenol compound has an average particle size (D50) of not more than 0.5 μm, and the coating solution has a color tone a* of not less than −4.0 as measured according to JIS Z 8729 and a whiteness W of not less than 62 as measured according to JIS Z 8715,

[2] the coating solution of [1], wherein the hindered phenol compound is a 1,1,3-tris-substituted butane compound represented by the following formula (2):

(2)

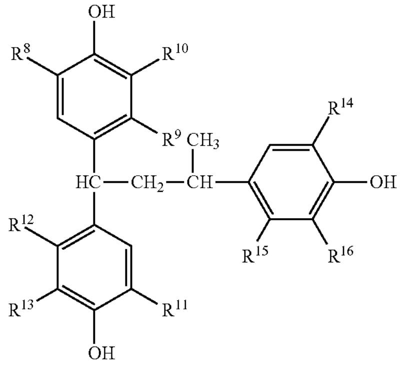

wherein $R^8$, $R^{11}$ and $R^{14}$ are each independently an alkyl group having a carbon number of 1-8, and $R^9$, $R^{10}$, $R^{12}$, $R^{13}$, $R^{15}$ and $R^{16}$ are each independently a hydrogen atom or an alkyl group having a carbon number of 1-8,

[3] the coating solution of [1] or [2], wherein the content of the hindered phenol compound is 0.01 part by weight-10 parts by weight, per 1 part by weight of the diphenylsulfone derivative represented by the formula (1),

[4] the coating solution of [2] or [3], wherein, in the aforementioned formula (2), $R^8$, $R^{11}$ and $R^{14}$ are tert-butyl groups, $R^9$, $R^{12}$ and $R^{15}$ are methyl groups, and $R^{10}$, $R^{13}$ and $R^{16}$ are hydrogen atoms,

[5] the coating solution of any of [2]-[4], wherein the aforementioned 1,1,3-tris-substituted butane compound of the formula (2) has a crystal structure showing the maximum diffracted X-ray peak within the range of diffraction angle (2θ)=6.4°-6.6°, a second maximum diffracted X-ray peak within the range of one of (2θ)=13.0°-13.2° and (2θ)=19.6°-19.8°, and a third maximum diffracted X-ray peak within the other range, in an X-ray diffraction measurement using CuKα ray as an X-ray source,

[6] the coating solution of any of [2]-[4], wherein the aforementioned 1,1,3-tris-substituted butane compound of the formula (2) is an amorphous hindered phenol compound,

[7] the coating solution of any of [1]-[6], wherein the aforementioned diphenylsulfone derivative represented by the formula (1) has an average particle size of 0.5 μm-5 μm,

[8] the coating solution of any of [1]-[7], which is prepared using a dispersion obtained by heating a dispersion containing the aforementioned diphenylsulfone derivative represented by the formula (1) at 40° C.-80° C. for 6 hr-72 hr,

[9] a thermal recording material comprising a support and a thermosensitive color developing layer formed thereon, wherein the thermosensitive color developing layer is formed with the coating solution of any of [1]-[8], and

[10] the thermal recording material of [9], further comprising a protection layer comprising carboxy-modified polyvinyl alcohol, epichlorohydrin resin and polyamine resin/polyamide resin on the thermosensitive color developing layer.

Effect of the Invention

According to the present invention, even when using as a developer a diphenylsulfone derivative represented by the above-mentioned formula (1), it is possible to provide a coating solution for a thermosensitive color developing layer with suppressed color development (excellent coloration resistance) and excellent storability, and a thermal recording material with suppressed coloration, a highly brilliant background color (white background), and excellent print portion (image portion) storability, particularly in terms of plasticizer resistance, oil resistance, heat resistance and the like.

Therefore, the thermal recording material of the present invention can be particularly suitably used for, for example, various tickets, receipts, labels, bank ATM output paper (sheets), gas, electricity and tap water meter reading output paper (sheets), bicycle race, horserace and other betting tickets, and the like.

MODES FOR EMBODYING THE INVENTION

Figure 1:
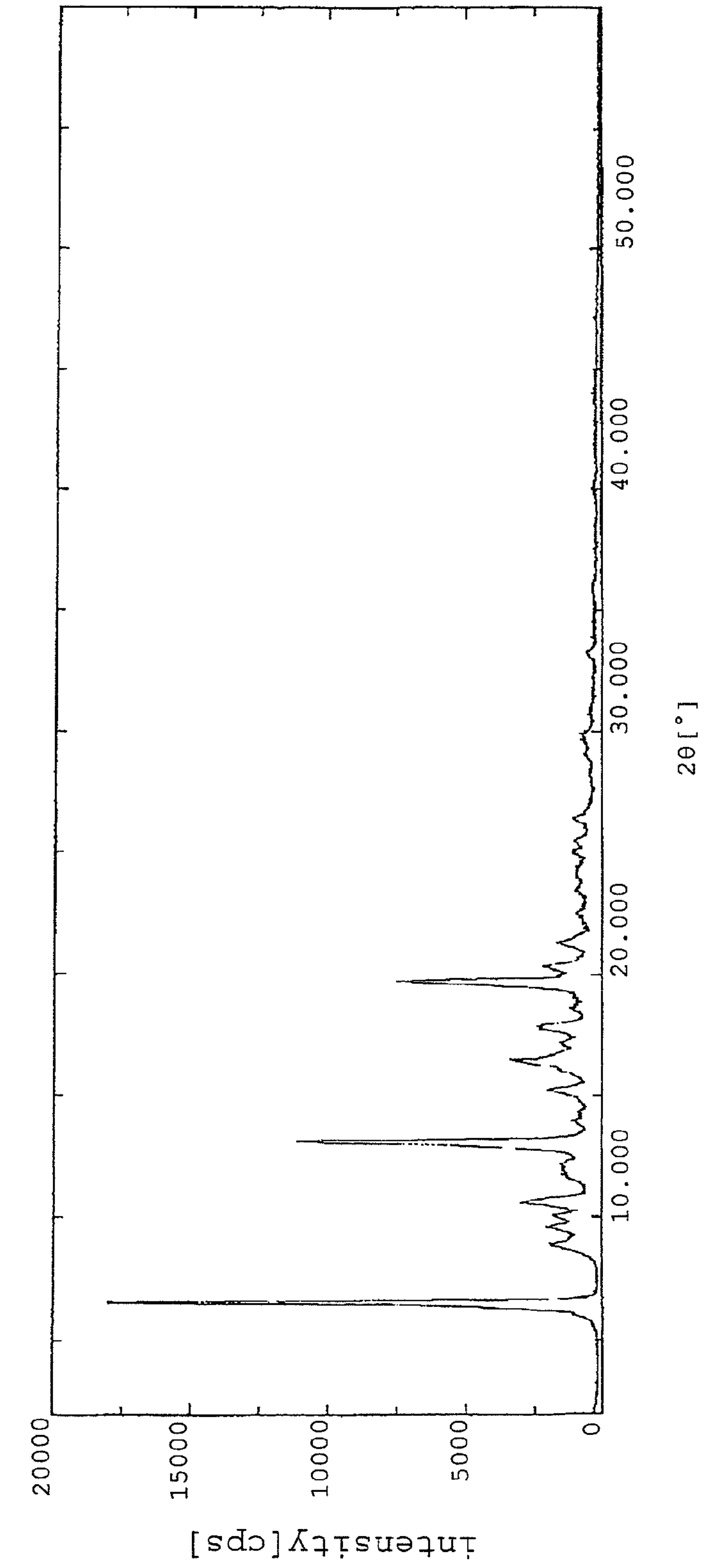
FIG. 1 is an X-ray diffraction chart, using CuKα ray as an X-ray source, of 1,1,3-tris(2-methyl-4-hydroxy-5-t-butylphenyl)butane <manufactured by OSAKA SHINYAKU CO., LTD., trade name: OS-930> used in Examples 1-10.

The present invention is explained in detail in the following by referring to Examples, which are not to be construed as limitative, and can be modified variously without departing from the gist of the present invention.

In the present specification, the numerical range shown with "-" means a range including the numerical values before and after "-" as the lower limit and upper limit.

The thermal recording material in the present invention is a thermal recording material having at least a support and a thermosensitive color developing layer provided on the support, wherein the layer comprises a colorless or pale-colored electron-donating leuco dye, an electron-accepting developer and a hindered phenol compound; as described below, the thermosensitive color developing layer is formed by forming on a support a coating film with a coating solution for a thermosensitive color developing layer comprising a colorless or pale-colored electron-donating leuco dye, an electron-accepting developer and a hindered phenol compound, and drying the coating film.

<Hindered Phenol Compound>

The hindered phenol compound to be used in the present invention generally contains one or more and not more than 15, preferably two or more and not more than 6, phenol groups in one molecule, and has a molecular weight of generally not less than 200 and not more than 3000, preferably not less than 300 and not more than 2500, more preferably not less than 400 and not more than 2500.

The hindered phenol compound to be used in the present invention has a melting point of preferably not less than 70° C., more preferably not less than 100° C., and a melting point upper limit of generally not more than 300° C., preferably not more than 150° C.

In the hindered phenol compound to be used in the present invention, at least one phenol group preferably has a hydrogen atom at the 2-position or the 6-position.

Specific examples of the hindered phenol compound to be used in the present invention include the following compounds.

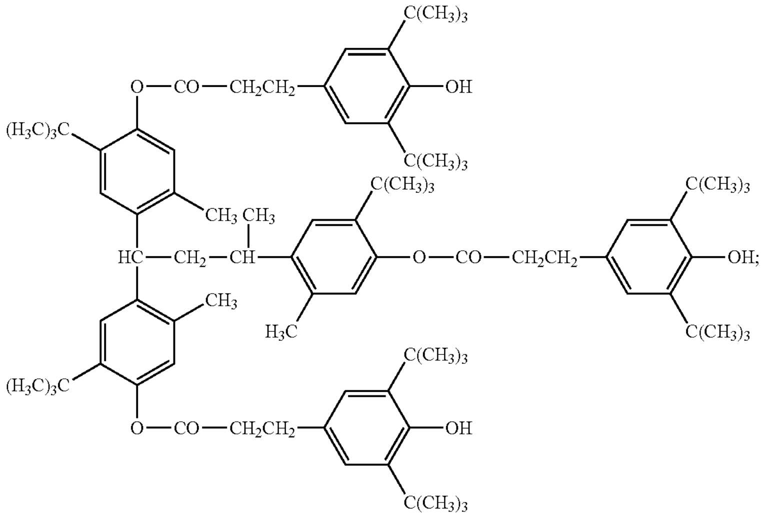

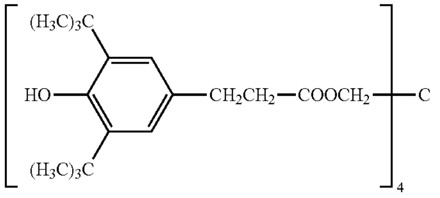

(manufactured by API Corporation: TOMINOX TT (trade name));

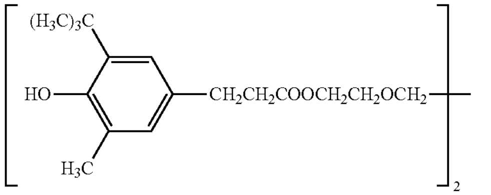

(manufactured by API Corporation: TOMINOX 917 (trade name));

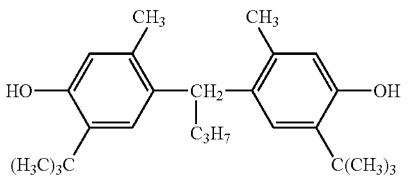

(manufactured by API Corporation: YOSHINOX BB (trade name));

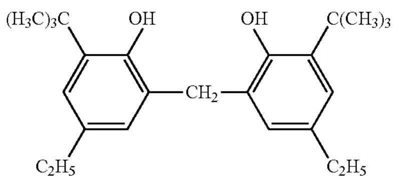 [SMILES: CCc1cc(Cc2cc(CC)cc(C(C)(C)C)c2O)c(O)c(C(C)(C)C)c1]

(manufactured by API Corporation: YOSHINOX 425 (trade name));

a 1,1,3-tris-substituted butane compound represented by the formula (2):

(2)

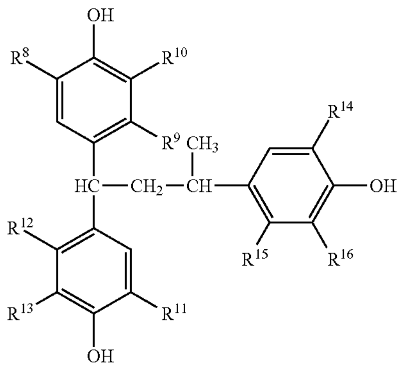

wherein $R^8$, $R^{11}$ and $R^{14}$ are each independently an alkyl group having a carbon number of 1-8, and $R^9$, $R^{10}$, $R^{12}$, $R^{13}$, $R^{15}$ and $R^{16}$ are each independently a hydrogen atom or an alkyl group having a carbon number of 1-8; and tris(hydroxyphenyl)alkane, 1,1,3-tris-substituted butane compounds described in JP-B-39-4469, JP-A-S56-40629 and the like.

In the present invention, any one kind of hindered phenol compound may be used or two or more kinds thereof may be used in a mixture.

In particular, from the aspect of coloration resistance of the coating solution, tris(hydroxyphenyl)alkane, 1,1,3-tris-substituted butane compounds are preferable, and particularly preferred are tris(hydroxyphenyl)alkane, 1,1,3-tris-substituted butane compounds described in JP-B-39-4469, JP-A-

S56-40629 and the like, 1,1,3-tris-substituted butane compounds represented by the above-mentioned formula (2) (hereinafter to be also referred to as 1,1,3-tris-substituted butane compounds of the formula (2)).

In the 1,1,3-tris-substituted butane compounds of the formula (2), an alkyl group having a carbon number of 1-8 for $R^8$, $R^{11}$ or $R^{14}$ may be linear, branched or cyclic, and specific examples thereof include methyl group, ethyl group, n-propyl group, isopropyl group, n-butyl group, isobutyl group, sec-butyl group, tert-butyl group, n-pentyl group, isopentyl group, sec-pentyl group, tert-pentyl group, 2-methylbutyl group, n-hexyl group, isohexyl group, sec-hexyl group, tert-hexyl group, cyclohexyl group, heptyl group, n-octyl group, isooctyl group, sec-octyl group, tert-octyl group, 2-ethylhexyl group and the like. Of these, an alkyl group having a carbon number of 1-6 is preferable. In the formula, $R^8$, $R^{11}$ and $R^{14}$ are preferably the same.

In the 1,1,3-tris-substituted butane compounds of the formula (2), an alkyl group having a carbon number of 1-8 for $R^9$, $R^{10}$, $R^{12}$, $R^{13}$, $R^{15}$ for $R^{16}$ may be linear, branched or cyclic, and specific examples thereof include methyl group, ethyl group, n-propyl group, isopropyl group, n-butyl group, isobutyl group, sec-butyl group, tert-butyl group, n-pentyl group, isopentyl group, sec-pentyl group, tert-pentyl group, 2-methylbutyl group, n-hexyl group, isohexyl group, sec-hexyl group, tert-hexyl group, cyclohexyl group, heptyl group, n-octyl group, isooctyl group, sec-octyl group, tert-octyl group, 2-ethylhexyl group and the like. Of these, an alkyl group having a carbon number of 1-5 is preferable.

preferably a hydrate having a crystal structure showing a maximum diffracted X-ray peak within the range of diffraction angle (2θ)=6.4°-6.6°, a second maximum diffracted X-ray peak within the range of (2θ)=13.0°-13.2°, and a third maximum diffracted X-ray peak within the range of (2θ)=19.6°-19.8°.

In addition, the 1,1,3-tris-substituted butane compounds of the formula (2) preferably has a melting point of 100° C.-140° C., more preferably 110° C.-135° C. Here, the melting point is measured according to JIS K 0064.

Specific examples of the 1,1,3-tris-substituted butane compounds of the formula (2) having such preferable crystal structure and melting point include the compound described in JP-A-S56-40629, OS-930 (trade name) manufactured by OSAKA SHINYAKU CO., LTD. and the like.

Moreover, the 1,1,3-tris-substituted butane compounds of the formula (2) is also preferably an amorphous compound showing, in an X-ray diffraction measurement using CuKα ray as an X-ray source, a half value width of the maximum diffracted X-ray peak at diffraction angle (2θ) of not more than 2. Such compound can be produced, for example, by a method including melting crystals of 1,1,3-tris-substituted butane compounds at a high temperature and rapidly cooling them and the like.

<Electron-accepting Developer>

In the thermal recording material of the present invention, the diphenylsulfone derivative represented by the following formula (1) is used as an electron-accepting developer.

(1)

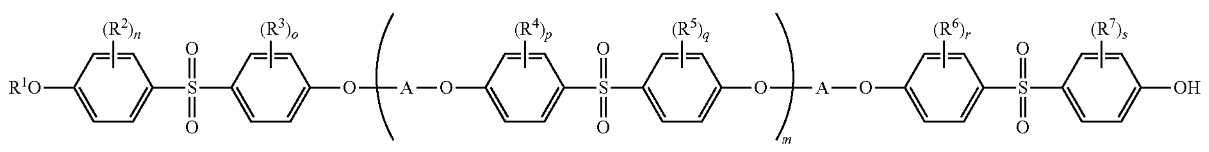

In the formula, $R^9$, $R^{10}$, $R^{12}$, $R^{13}$, $R^{15}$ and $R^{16}$ are each preferably a hydrogen atom or an alkyl group having a carbon number of 1-5, and at least one of $R^{10}$, $R^{13}$ and $R^{16}$ is more preferably a hydrogen atom.

The 1,1,3-tris-substituted butane compounds of the formula (2) is preferably a compound wherein $R^8$, $R^{11}$ and $R^{14}$ are each a tert-butyl group, $R^9$, $R^{12}$ and $R^{15}$ are each a methyl group, and $R^{10}$, $R^{13}$ and $R^{16}$ are each a hydrogen atom (e.g., ADK STAB AO-30 (trade name) manufactured by ADEKA CORPORATION, OS-930 (trade name) manufactured by OSAKA SHINYAKU CO., LTD. etc.), or a compound wherein $R^8$, $R^{11}$ and $R^{14}$ are each a cyclohexyl group, $R^9$, $R^{12}$ and $R^{15}$ are each a methyl group, and $R^{10}$, $R^{13}$ and $R^{16}$ are each a hydrogen atom (e.g., ADEKA ARKLS DH-43 (trade name) manufactured by ADEKA CORPORATION etc.), particularly preferably, a compound wherein $R^8$, $R^{11}$ and $R^{14}$ are each a tert-butyl group, $R^9$, $R^{12}$ and $R^{15}$ are each a methyl group, and $R^{10}$, $R^{13}$ and $R^{16}$ are each a hydrogen atom (i.e., "1,1,3-tris(2-methyl-4-hydroxy-5-t-butylphenyl)butane").

In addition, the 1,1,3-tris-substituted butane compounds of the formula (2) is preferably a hydrate having a crystal structure showing, in Xray diffraction measurement using CuKα ray as an X-ray source, a maximum diffracted X-ray peak within the range of diffraction angle (2θ)=6.4°-6.6°, a second maximum diffracted X-ray peak within the range of one of (2θ)=13.0°-13.2° and (2θ)=19.6°-19.8°, and a third maximum diffracted X-ray peak within the other range, more wherein $R^1$ is a linear or branched, saturated or unsaturated hydrocarbon group having a carbon number of 1-12, $R^2$-$R^7$ are each independently a halogen atom, or an alkyl group or alkenyl group having a carbon number of 1-12, n, o, p, q, r and s are each an integer of 0-4, m is an integer of 0-5, and each A is independently a linear or branched, saturated or unsaturated hydrocarbon group having a carbon number of 1-12 and optionally having an ether bond.

In the diphenylsulfone derivative, when a linear or branched, saturated or unsaturated hydrocarbon group having a carbon number of 1-12 for $R^1$ in the formula is a saturated hydrocarbon group, the carbon number is preferably 1-5, more preferably 1-4, and, for example, methyl group, ethyl group, n-propyl group, isopropyl group, n-butyl group, t-butyl group, isoamyl group and the like can be mentioned. When it is an unsaturated hydrocarbon group, the carbon number is preferably 2-5, and, for example, vinyl group (ethynyl group), allyl group, isopropenyl group, 1-propenyl group, 2-butenyl group, 3-butenyl group, 1,3-butanedienyl group, 2-methyl-2-propenyl group and the like can be mentioned.

In the formula, $R^2$-$R^7$ are each independently a halogen atom, or an alkyl group or alkenyl group having a carbon number of 1-12. Examples of the halogen atom include chlorine, bromine, fluorine and iodine, and chlorine and bromine are particularly preferable. The alkyl group having a carbon number of 1-12 may be linear or branched, and preferably has a carbon number of 1-5, more preferably 1-4. Examples thereof include methyl group, ethyl group, n-propyl group, isopropyl group, n-butyl group, t-butyl group, n-pentyl group, isopentyl group, neopentyl group, t-pentyl group, n-hexyl group, isohexyl group, 1-methylpentyl group, 2-methylpentyl group and the like. The alkenyl group may be linear or branched, and preferably has a carbon number of 2-12. Examples thereof include vinyl group (ethynyl group), allyl group, isopropenyl group, 1-propenyl group, 2-butenyl group, 3-butenyl group, 1,3-butanedienyl group, 2-methyl-2-propenyl group and the like, with preference given to vinyl group and allyl group.

In the formula, n, o, p, q, r and s are each an integer of 0-4, preferably 0-2, more preferably 0. When n, o, p, q, r and s are each 2-4, 2 to 4 groups out of $R^2$-$R^7$ may be the same or different, and preferably the same.

In the formula, each A is independently a linear or branched, saturated or unsaturated hydrocarbon group having a carbon number of 1-12 and optionally having an ether bond. Preferred is a linear saturated hydrocarbon group optionally having an ether bond, and more preferred is a linear saturated hydrocarbon group without an ether bond.

The saturated hydrocarbon group is, for example, a linear or branched, saturated hydrocarbon group having a carbon number of 1-12, preferably 2-6, more preferably 3-4. Specific examples include, methylene group, ethylene group, trimethylene group, tetramethylene group, pentamethylene group, hexamethylene group, heptamethylene group, octamethylene group, nonamethylene group, decamethylene group, undecamethylene group, dodecamethylene group, methylmethylene group, dimethylmethylene group, methylethylene group, methyleneethylene group, ethylethylene group, 1,2-dimethylethylene group, 1-methyltrimethylene group, 1-methyltetramethylene group, 1,3-dimethyltrimethylene group, 1-ethyl-4-methyl-tetramethylene group and the like, with preference given to ethylene group, trimethylene group, tetramethylene group, pentamethylene group, and hexamethylene group.

The unsaturated hydrocarbon group is, for example, a linear or branched, unsaturated hydrocarbon group having a carbon number of 1-12, preferably 2-6, more preferably 2-4. Specific examples include vinylene group, ethynylene group, propenylene group, 2-butenylene group, 2-butynylene group, 1-vinylethylene group and the like, with preference given to propenylene group, 2-butenylene group and the like.

Examples of the hydrocarbon group having an ether bond include ethyleneoxyethylene group, tetramethyleneoxytetramethylene group, ethyleneoxyethyleneoxyethylene group, ethyleneoxymethyleneoxyethylene group, 1,3-dioxane-5,5-bismethylene group and the like, with preference given to ethyleneoxyethylene group and ethyleneoxyethyleneoxyethylene group.

In the formula, m is an integer of 0-5, preferably 0-2, more preferably 0.

In the present invention, the diphenylsulfone derivative represented by the formula (1) may be a single compound wherein m is a particular number, or a mixture of compounds different in m, at any mixing ratio.

Specific examples of the diphenylsulfone derivative represented by the formula (1) include, but are not limited to, the following compounds.

1-[4-(4-hydroxyphenylsulfonyl)phenoxy]-2-[4-(4-isopropoxyphenylsulfonyl)phenoxy]ethane, 1-[4-(4-hydroxyphenylsulfonyl)phenoxy]-3-[4-(4-isopropoxyphenylsulfonyl)phenoxy]propane, 1-[4-(4-hydroxyphenylsulfonyl)phenoxy]-4-[4-(4-isopropoxyphenylsulfonyl)phenoxy]butane, 1-[4-(4-hydroxyphenylsulfonyl)phenoxy]-5-[4-(4-isopropoxyphenylsulfonyl)phenoxy]pentane, 1-[4-(4-hydroxyphenylsulfonyl)phenoxy]-6-[4-(4-isopropoxyphenylsulfonyl)phenoxy]hexane, 1-[4-(4-hydroxyphenylsulfonyl)phenoxy]-7-[4-(4-isopropoxyphenylsulfonyl)phenoxy]heptane, 1-[4-(4-hydroxyphenylsulfonyl)phenoxy]-8-[4-(4-isopropoxyphenylsulfonyl)phenoxy]octane, 4-(4-[4-(4-hydroxyphenylsulfonyl)phenoxy]butoxy)-4'-(4-[4-(4-methoxyphenylsulfonyl)phenoxy]butoxy)diphenylsulfone, 4-(4-(2-(4-(4-(2-(4-(4-(2-(4-(4-methoxyphenylsulfonyl)phenoxy)butoxy)phenylsulfonyl)phenoxy)butoxy)phenylsulfonyl)phenoxy)butoxy)phenylsulfonyl)phenol and the like. Of these, 1-(4-(4-hydroxyphenylsulfonyl)phenoxy)-4-(4-(4-isopropoxyphenylsulfonyl)phenoxy)butane is preferable from the aspect of the balance of color developing sensitivity and storability.

The diphenylsulfone derivative represented by the formula (1) can be easily obtained by a synthesis method including, for example, reacting a compound represented by the formula (3):

(3)

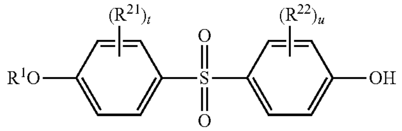

wherein $R^1$ is as defined above, $R^{21}$ and $R^{22}$ are each independently a halogen atom, or an alkyl group or alkenyl group having a carbon number of 1-12, and t and u are each an integer of 0-4, with a compound represented by the formula (4):

Cl-A-Cl (4)

wherein A is as defined above, in the presence of a basic catalyst, and further reacting the obtained compound with a compound represented by the formula (5):

(5)

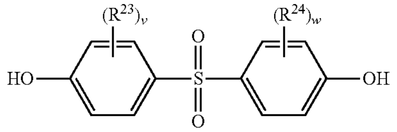

wherein $R^{23}$ and $R^{24}$ are each independently a halogen atom, or an alkyl group or alkenyl group having a carbon number of 1-12, and v and w are each an integer of 0-4, in the presence of a basic catalyst and the like. The reaction is performed in a suitable solvent (e.g., water, methanol, ethanol, n-propyl alcohol, isopropyl alcohol, acetonitrile, toluene, chloroform, diethyl ether, N,N-dimethylacetamide, N,N-dimethylformamide, benzene, chlorobenzene, dichlorobenzene, diethylketone, ethylmethylketone, acetone, tetrahydrofuran etc.) capable of dissolving a starting material and a reaction product and inert to the reaction, at a reaction temperature of 0° C.-150° C. for a few hours to several dozen hours. After the reaction, a single object compound can be obtained in a high yield by recrystallization from these solvents or purification by silica gel column chromatography.

In the thermal recording material of the present invention, the content of the hindered phenol compound in the thermosensitive color developing layer is generally 0.01 part by weight-10 parts by weight, preferably 0.02 parts by weight-2 parts by weight, more preferably 0.05 parts by weight-0.5 parts by weight, per 1 part by weight of the diphenylsulfone derivative of the formula (1).

In the present invention, the content of the hindered phenol compound in a coating solution for a thermosensitive color developing layer is generally 0.01 part by weight-10 parts by weight, preferably 0.02 parts by weight-2 parts by weight, more preferably 0.05 parts by weight-0.5 parts by weight, per 1 part by weight of the diphenylsulfone derivative of the formula (1).

When the content of the hindered phenol compound is less than 0.01 part by weight, the suppressive effect on coloration of a coating solution for a thermosensitive color developing layer may not be sufficient, and when it is higher than 10 parts by weight, storability such as the plasticizer resistance, oil resistance, heat resistance and the like of the print portion (image portion) on thermal recording material may be low.

In the thermal recording material of the present invention, as long as the effect of the diphenylsulfone derivative represented by the formula (1) is not impaired, other developers can also be used concurrently in the thermosensitive color developing layer. When other developer is used in combination, the amount of the developer to be combined is determined according to the desired property and recording property, and is not particularly limited, and it is generally 0.001 part by weight-1000 parts by weight, preferably 0.01 part by weight-50 parts by weight, per 1 part by weight of the diphenylsulfone derivative represented by the formula (1).

As such other developer, any which is conventionally known in the fields of pressure sensitive or thermal recording paper, such as various electron-accepting compounds or oxidants etc., can be used, and is not particularly limited.

For example, inorganic acidic substances such as active white clay, attapulgite, colloidal silica, aluminum silicate and the like; 4,4'-isopropylidenediphenol, 1,1-bis(4-hydroxyphenyl)cyclohexane, 2,2-bis(4-hydroxyphenyl)-4-methylpentane, 4,4'-dihydroxydiphenylsulfide, hydroquinonemonobenzylether, benzyl 4-hydroxybenzoate, 2,4'-dihydroxydiphenylsulfone, bis(3-allyl-4-hydroxyphenyl) sulfone, 4-hydroxyphenyl-4'-benzyloxyphenylsulfone, 3,4-dihydroxyphenyl-4'-methylphenylsulfone, aminobenzenesulfoneamide derivative described in JP-A-H08-59603, bis(4-hydroxyphenylthioethoxy)methane, 1,5-di(4-hydroxyphenylthio)-3-oxapentane, bis(p-hydroxyphenyl)butyl acetate, bis(p-hydroxyphenyl)methyl acetate, 1,1-bis(4-hydroxyphenyl)-1-phenylethane, 1,4-bis[α-methyl-α-(4'-hydroxyphenyl)ethyl]benzene, 1,3-bis[α-methyl-α-(4'-hydroxyphenyl)ethyl]benzene, di(4-hydroxy-3-methylphenyl)sulfide, 2,2'-thiobis(3-tert-octylphenol), 2,2'-thiobis(4-tert-octylphenol), compounds described in WO02/081229 or JP-A-2002-301873 and the like can be mentioned.

In addition, thiourea compounds such as N,N'-di-m-chlorophenylthiourea and the like; aromatic carboxylic acids such as p-chlorobenzoic acid, stearyl gallate, bis[4-(n-octyloxycarbonylamino)zinc salicylate]dihydrate, 4-[2-(p-methoxyphenoxy)ethyloxy]salicylic acid, 4-[3-(p-tolylsulfonyl)propyloxy]salicylic acid, 5-[p-(2-p-methoxyphenoxyethoxy) cumyl]salicylic acid and salts of these aromatic carboxylic acid with a polyvalent metal salts such as zinc, magnesium, aluminum, calcium, titanium, manganese, tin, nickel and the like; zinc thiocyanate antipyrine complex; composite zinc salt of terephthalaldehyde acid and other aromatic carboxylic acid, and the like can be mentioned. These developers may be used alone or two or more kinds thereof may be combined. Also, metal chelate type color developing components such as higher fatty acid metal double salt described in JP-A-H10-258577, polyvalent hydroxyaromatic compound and the like can be contained.

<Electron-donating Leuco Dye>

As the colorless or pale-colored electron-donating leuco dye to be used in the present invention, those conventionally known in the field of pressure sensitive or thermal recording can be used without limitation. Although it is not particularly limited, triphenylmethane compounds, fluoran compounds, fluorene compounds, divinyl compounds and the like are preferable. Specific examples of the representative colorless or pale-colored electron-donating leuco dye (dye precursor) are shown below. These dyes (dye precursors) may be used alone or two or more kinds thereof may be combined.

<Triphenylmethane Leuco Dye>

3,3-bis(p-dimethylaminophenyl)-6-dimethylaminophthalide [aka crystal violet lactone],
3,3-bis(p-dimethylaminophenyl)phthalide [aka malachite green lactone]

<Fluoran Leuco Dye>

3-diethylamino-6-methylfluoran,
3-diethylamino-6-methyl-7-anilinofluoran,
3-diethylamino-6-methyl-7-(o,p-dimethylanilino)fluoran,
3-diethylamino-6-methyl-7-chlorofluoran,
3-diethylamino-6-methyl-7-(m-trifluoromethylanilino)fluoran,
3-diethylamino-6-methyl-7-(o-chloroanilino)fluoran,
3-diethylamino-6-methyl-7-(p-chloroanilino)fluoran,
3-diethylamino-6-methyl-7-(o-fluoroanilino)fluoran,
3-diethylamino-6-methyl-7-(m-methylanilino)fluoran,
3-diethylamino-6-methyl-7-n-octylanilinofluoran,
3-diethylamino-6-methyl-7-n-octylaminofluoran,
3-diethylamino-6-methyl-7-benzylaminofluoran,
3-diethylamino-6-methyl-7-dibenzylaminofluoran,
3-diethylamino-6-chloro-7-methylfluoran,
3-diethylamino-6-chloro-7-anilinofluoran,
3-diethylamino-6-chloro-7-p-methylanilinofluoran,
3-diethylamino-6-ethoxyethyl-7-anilinofluoran,
3-diethylamino-7-methylfluoran,
3-diethylamino-7-chlorofluoran,
3-diethylamino-7-(m-trifluoromethylanilino)fluoran,
3-diethylamino-7-(o-chloroanilino)fluoran,
3-diethylamino-7-(p-chloroanilino)fluoran,
3-diethylamino-7-(o-fluoroanilino)fluoran,
3-diethylamino-benzo[a]fluoran,
3-diethylamino-benzo[c]fluoran,
3-dibutylamino-6-methyl-fluoran,
3-dibutylamino-6-methyl-7-anilinofluoran,
3-dibutylamino-6-methyl-7-(o,p-dimethylanilino)fluoran,
3-dibutylamino-6-methyl-7-(o-chloroanilino)fluoran,
3-dibutylamino-6-methyl-7-(p-chloroanilino)fluoran,
3-dibutylamino-6-methyl-7-(o-fluoroanilino)fluoran,
3-dibutylamino-6-methyl-7-(m-trifluoromethylanilino)fluoran,
3-dibutylamino-6-methyl-chlorofluoran,
3-dibutylamino-6-ethoxyethyl-7-anilinofluoran,
3-dibutylamino-6-chloro-7-anilinofluoran,
3-dibutylamino-6-methyl-7-p-methylanilinofluoran,
3-dibutylamino-7-(o-chloroanilino)fluoran,
3-dibutylamino-7-(o-fluoroanilino)fluoran,
3-di-n-pentylamino-6-methyl-7-anilinofluoran,
3-di-n-pentylamino-6-methyl-7-(p-chloroanilino)fluoran,
3-di-n-pentylamino-7-(m-trifluoromethylanilino)fluoran,
3-di-n-pentylamino-6-chloro-7-anilinofluoran,
3-di-n-pentylamino-7-(p-chloroanilino)fluoran,
3-pyrrolidino-6-methyl-7-anilinofluoran,
3-piperidino-6-methyl-7-anilinofluoran, 3-(N-methyl-N-propylamino)-6-methyl-7-anilinofluoran,
3-(N-methyl-N-cyclohexylamino)-6-methyl-7-anilinofluoran,
3-(N-ethyl-N-cyclohexylamino)-6-methyl-7-anilinofluoran,
3-(N-ethyl-N-hexylamino)-6-methyl-7-(p-chloroanilino) fluoran,
3-(N-ethyl-p-toluidino)-6-methyl-7-anilinofluoran,
3-(N-ethyl-N-isoamylamino)-6-methyl-7-anilinofluoran,
3-(N-ethyl-N-isoamylamino)-6-chloro-7-anilinofluoran,
3-(N-ethyl-N-tetrahydrofurfurylamino)-6-methyl-7-anilinofluoran,
3-(N-ethyl-N-isobutylamino)-6-methyl-7-anilinofluoran,
3-(N-ethyl-N-ethoxypropylamino)-6-methyl-7-anilinofluoran,
3-cyclohexylamino-6-chlorofluoran,
2-(4-oxahexyl)-3-dimethylamino-6-methyl-7-anilinofluoran,
2-(4-oxahexyl)-3-diethylamino-6-methyl-7-anilinofluoran,
2-(4-oxahexyl)-3-dipropylamino-6-methyl-7-anilinofluoran,
2-methyl-6-p-(p-dimethylaminophenyl)aminoanilinofluoran,
2-methoxy-6-p-(p-dimethylaminophenyl)aminoanilinofluoran,
2-chloro-3-methyl-6-p-(p-phenylaminophenyl)aminoanilinofluoran,
2-chloro-6-p-(p-dimethylaminophenyl)aminoanilinofluoran,
2-nitro-6-p-(p-diethylaminophenyl)aminoanilinofluoran,
2-amino-6-p-(p-diethylaminophenyl)aminoanilinofluoran,
2-diethylamino-6-p-(p-diethylaminophenyl)aminoanilinofluoran,
2-phenyl-6-methyl-6-p-(p-phenylaminophenyl)aminoanilinofluoran,
2-benzyl-6-p-(p-phenylaminophenyl)aminoanilinofluoran,
2-hydroxy-6-p-(p-phenylaminophenyl)aminoanilinofluoran,
3-methyl-6-p-(p-dimethylaminophenyl)aminoanilinofluoran,
3-diethylamino-6-p-(p-diethylaminophenyl)aminoanilinofluoran,
3-diethylamino-6-p-(p-dibutylaminophenyl)aminoanilinofluoran,
2,4-dimethyl-6-[(4-dimethylamino)anilino]-fluoran.

<Fluorene Leuco Dye>

3,6,6'-tris(dimethylamino)spiro[fluorene-9,3'-phthalide],
3,6,6'-tris(diethylamino)spiro[fluorene-9,3'-phthalide].

<Divinyl Leuco Dye>

3,3-bis-[2-(p-dimethylaminophenyl)-2-(p-methoxyphenyl) ethenyl]-4,5,6,7-tetrabromophthalide,
3,3-bis-[2-(p-dimethylaminophenyl)-2-(p-methoxyphenyl) ethenyl]-4,5,6,7-tetrachlorophthalide,
3,3-bis-[1,1-bis(4-pyrrolidinophenyl)ethylen-2-yl]-4,5,6,7-tetrabromophthalide,
3,3-bis-[1-(4-methoxyphenyl)-1-(4-pyrrolidinophenyl)ethylen-2-yl]-4,5,6,7-tetrachlorophthalide.

<Others>

3-(4-diethylamino-2-ethoxyphenyl)-3-(1-ethyl-2-methylindol-3-yl)-4-azaphthalide,
3-(4-diethylamino-2-ethoxyphenyl)-3-(1-octyl-2-methylindol-3-yl)-4-azaphthalide,
3-(4-cyclohexylethylamino-2-methoxyphenyl)-3-(1-ethyl-2-methylindol-3-yl)-4-azaphthalide,
3,3-bis(1-ethyl-2-methylindol-3-yl)phthalide,
3,6-bis(diethylamino)fluoran-γ-(3'-nitro)anilinolactam,
3,6-bis(diethylamino)fluoran-γ-(4'-nitro)anilinolactam,
1,1-bis-[2',2',2",2"-tetrakis-(p-dimethylaminophenyl)ethenyl]-2,2-dinitrileethane,
1,1-bis-[2',2',2",2"-tetrakis-(p-dimethylaminophenyl)ethenyl]-2-β-naphthoylethane,
1,1-bis-[2',2',2",2"-tetrakis-(p-dimethylaminophenyl)ethenyl]-2,2-diacetylethane,
bis-[2,2,2',2'-tetrakis-(p-dimethylaminophenyl)-ethenyl]-methylmalonic acid dimethyl ester.

Examples of other materials that can be contained in the thermosensitive color developing layer of thermal recording material of the present invention are shown below. The thermosensitive color developing layer can contain sensitizer, binder, crosslinking agent, lubricant and the like, as long as the effect of the present invention is not inhibited.

<Sensitizer>

As the sensitizer, conventionally known sensitizers can be used without limitation. For example, fatty acid amides such as stearic acid amide, palmitic acid amide and the like, ethylenebisamide, montanic acid wax, polyethylene wax, 1,2-di-(3-methylphenoxy)ethane, p-benzylbiphenyl, β-benzyloxynaphthalene, 4-biphenyl-p-tolylether, m-terphenyl, 1,2-diphenoxyethane, dibenzyl oxalate, di(p-chlorobenzyl) oxalate, di(p-methylbenzyl)oxalate, dibenzyl terephthalate, benzyl p-benzyloxybenzoate, di-p-tolyl carbonate, phenyl α-naphthylcarbonate, 1,4-diethoxynaphthalene, 1-hydroxy-2-naphthoic acid phenyl ester, o-xylene-bis-(phenylether), 4-(m-methylphenoxymethyl)biphenyl, 4,4'-ethylenedioxy-bis-benzoic acid dibenzyl ester, dibenzoyloxymethane, 1,2-di(3-methylphenoxy)ethylene, bis[2-(4-methoxy-phenoxy) ethyl]ether, methyl p-nitrobenzoate, phenyl p-toluenesulfonate can be recited as examples. Of these, β-benzyloxynaphthalene and 1,2-di-(3-methylphenoxy) ethane are preferable from the aspect of color developing sensitivity.

<Binder>

While the binder is not particularly limited, the following are preferable. For example, polyvinyl alcohol macromolecular substances such as completely saponified polyvinyl alcohol, partially saponified polyvinyl alcohol, acetoacetyl polyvinyl alcohol, carboxy-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrrolidone-modified polyvinyl alcohol, silicone-modified polyvinyl alcohol, other modified polyvinyl alcohols, and the like; cellulose derivatives such as hydroxyethyl cellulose, methyl cellulose, ethyl cellulose, carboxymethyl cellulose, acetylcellulose and the like; styrene copolymers such as styrene-maleic anhydride copolymer, styrene-butadiene copolymer and the like, and the like can be mentioned. In addition, casein, gum arabic, oxidized starch, etherified starch, dialdehyde starch, esterified starch, polyvinyl chloride, polyvinyl acetate, polyacrylamide, polyacrylic acid ester, polyvinyl butyral, polystyrol and their copolymers, polyamide resin, silicone resin, petroleum resin, terpene resin, ketone resin and cumarone resin and the like can be recited as examples. One or more kinds of these macromolecular substances can be used. Of these, polyvinyl alcohol macromolecular substance is preferable. Binders are generally dissolved in solvents such as water, alcohols, ketones, esters, hydrocarbon and the like or processed into the form of a solution or dispersion in which binders are dispersed in an emulsion or a paste, and used for formation of a thermosensitive color developing layer on a support.

<Crosslinking Agent>

Crosslinking agent is not particularly limited, and can be appropriately selected according to the object from known ones. For example, glyoxal, methylolmelamine, melamine formaldehyde resin, melamine urea resin, polyamine epichlorohydrin resin, polyamide epichlorohydrin resin, potassium persulfate, ammonium persulfate, sodium persulfate, ferric chloride, magnesium chloride, borax, boric acid, alum, ammonium chloride and the like can be used. Depending on the desired quality, any one of them or two or more kinds thereof can be used in combination.

<Pigment>

Pigment is not particularly limited, and can be appropriately selected according to the object from known ones. For example, inorganic pigments such as silica, kaolin, calcined kaolin, calcium carbonate, aluminum oxide, titanium oxide, magnesium carbonate, aluminum silicate, magnesium silicate, calcium silicate, aluminum hydroxide, diatomite, talc and the like can be mentioned. Organic pigments (e.g., melamine resin filler, urea-formalin resin filler, polyethylene powder, nylon powder etc.) may also be used. One or more kinds of these pigments can be used.

<Lubricant>

Lubricant is not particularly limited, and can be appropriately selected according to the object from known ones. For example, fatty acid metal salts such as zinc stearate, calcium stearate and the like, waxes, silicone resins and the like can be mentioned. One or more kinds of these lubricants can be used.

Besides the aforementioned sensitizers, pigments, lubricants etc., image stabilizer, benzophenone type or triazole type UV absorber, dispersing agent, antifoaming agent, antioxidant, fluorescence dye and the like can be blended with the thermosensitive color developing layer according to the object.

In the thermal recording material of the present invention, the amount of the developer to be used for the thermosensitive color developing layer is determined according to the desired property and recording properties, and is not particularly limited. Generally, a developer is used in an amount of about 0.1 parts by weight-10 parts by weight, preferably about 0.5 parts by weight-5 parts by weight, per 1 part by weight of a colorless or pale-colored electron-donating leuco dye. When the amount thereof to be used is too high, the storability may decrease, and when it is too small, the printing density may become low and storability may decrease.

The kind and amount of the sensitizer, image stabilizer, pigment, lubricant and the like, as well as various other components to be used for the thermosensitive color developing layer are determined according to the property and recording properties requested of the thermal recording material, and are not particularly limited. A sensitizer is preferably used in about 0.5 parts by weight-10 parts by weight per 1 part by weight of dye, and an image stabilizer is preferably used in about 0.01 part by weight-10 parts by weight per 1 part by weight of dye. Other components are each generally used in about 0.01 part by weight-10 parts by weight per 1 part by weight of dye.

The aforementioned binder, crosslinking agent, pigment etc. can also be used not only for the thermosensitive color developing layer but also for various functional layers formed as necessary such as the below-mentioned protection layer to protect the thermosensitive color developing layer and the like.

<Support>

Support is not subject to any particular limitation with regard to its shape, structure, size, material and the like, and can be appropriately selected according to the object. Examples of the shape include sheet, roll, flat plate and the like. The structure may be a single layer structure or a laminate structure, and the size can be appropriately selected according to the use of the object thermal recording material. Examples of the material include plastic film, synthetic paper, wood free paper, waste paper pulp, recycled paper, luster paper, oil proof paper, coated paper, art paper, cast coated paper, weak coated paper, resin laminated paper, release paper and the like. Alternatively, a composite sheet made of a combination thereof may be used as a support.

The thickness (total thickness) of the support is not particularly limited, and can be appropriately selected according to the object. It is preferably 30 μm-2,000 μm, more preferably 50 μm-1,000 μm.

In thermal recording material of the present invention, a method of forming a thermosensitive color developing layer is not particularly limited, and a generally-known method can be used for the formation. For example, the layer can be formed by preparing a coating solution (a coating solution for a thermosensitive color developing layer) wherein a dye, a developer (diphenylsulfone derivative represented by the formula (1)) and a hindered phenol compound, and other materials (sensitizer etc.) to be added as necessary are dispersed, applying the coating solution on a support to give a coating film, and drying the film. For the preparation of a coating solution, solvents such as water, alcohols, ketones, esters and the like can be used.

The various materials (dye, developer, hindered phenol compound, sensitizer etc.) are preferably used for the preparation of a coating solution after dividing into fine particles having an average particle size of several microns or below by a grinding machine or emulsifying apparatus such as ball mill, attritor, sand grinder and the like. In addition, it is preferable to prepare a dispersion of each material and mix such dispersions to give a coating solution. Particularly, a coating solution (coating solution for a thermosensitive color developing layer) is preferably prepared by preparing a dispersion of each material wherein the material has been wet pulverized in the presence of a binder and a solvent such as water, alcohols, ketones, esters and the like into fine particles having an average particle size of not more than several microns (preferably about 0.1 μm-5 μm), and mixing them.

The average particle size in the present specification refers to a volume average particle size (D50) in number base distribution, which can be measured by a laser diffraction/scattering particle size distribution analyzer. Specifically, it can be measured by laser diffraction scattering type particle size analyzer, Microtrack MT3000 manufactured by NIKKISO CO., LTD.

In the present invention, the hindered phenol compound preferably has an average particle size (D50) of not more than 0.5 μm, more preferably 0.1 μm-0.3 μm, particularly preferably 0.1 μm-0.2 μm. When the average particle size of the hindered phenol compound exceeds 0.5 μm, a sufficient coloration preventive effect on the coating solution during preservation may not be achieved. When it is less than 0.1 μm, whiteness may decrease although greenish coloration of the coating solution can be suppressed.

In addition, the average particle size (D50) of the diphenylsulfone derivative represented by the formula (1) is preferably 0.5 μm-5 μm, more preferably 0.5-1.5 μm, still more preferably 0.5-1.0 μm and most preferably 0.5 μm-0.9 μm. When the average particle size of the diphenylsulfone derivative is less than 0.5 μm, the coloration preventive effect on the coating solution tends to be insufficient, and when it exceeds 5 μm, the color developing sensitivity tends to decrease.

In the present invention, a dispersion containing the diphenylsulfone derivative represented by the formula (1), which is used for the preparation of a coating solution, is heated at 40° C.-80° C., preferably 50° C.-70° C., whereby a higher coloration preventive effect can be obtained. When the heating temperature exceeds 80° C., coagulation may occur to change its nature, and when it is less than 40° C., a sufficient effect by heating may not be achieved. The heating time is generally about 6 hr-72 hr. To achieve a sufficient effect in a shorter time, it is preferably 6 hr-48 hr, more preferably 6 hr-30 hr.

The solid content of the coating solution is generally preferably about 20 wt %-40 wt %. A method of application of a coating solution is not particularly limited, and the solution can be applied according to a conventionally used well-known technique. For example, an off-machine coater and an on-machine coater provided with various coaters such as air knife coater, rod blade coater, bent blade coater, beveled-blade coater, roll coater, curtain coater and the like are appropriately selected and used. A method of drying the coating film is not particularly limited, and various methods can be used such as drying by standing, drying with a forced air dryer and the like. For drying with heating, the temperature is preferably about 30° C.-100° C.

The amount of the thermosensitive color developing layer to be coated (dry weight of coating film) can be appropriately determined according to its composition, use of the thermal recording material and the like. It is generally 1 $g/m^2$-20 $g/m^2$, preferably 2 $g/m^2$-12 $g/m^2$.

For the coating solution for the thermosensitive color developing layer of the present invention, the a* in the L*a*b * color system as measured in accordance with JIS Z 8729 is normally −4.0 or more, preferably −3.6 or more, more preferably −3.4 or more (the upper limit is preferably 10 or less), and the whiteness W as measured in accordance with JIS Z 8715 is normally 62 or more, preferably 65 or more, more preferably 66 or more, particularly preferably 67 or more. For this reason, the thermosensitive color developing layer prepared by applying the coating solution for the thermosensitive color developing layer on the support assumes a color with no feeling of difference for a white color. Although the higher the whiteness W is, the better, with no limitations, the upper limit is 100 or less, 90 or less, or 80 or less.

For the coating solution for the thermosensitive color developing layer of the present invention, the b* in the L*a*b* color system as measured in accordance with JIS Z 8729 is normally −8 or more and 55 or less, preferably −5 or more and 2 or less, and the L* is normally 84 or more, preferably 85 or more, more preferably 86 or more. If the a* is −3.4 or more and 10 or less, green colors become unlikely to develop, and a color with a less feeling of difference for a white color is obtained, so that this is particularly preferable. If the a* is less than −4.0, green colors develop intensely to the extent of possible green staining on thermosensitive color developing layer formed on the support, so that barcode applicability reductions and the like are of concern.

In the present invention, the coloration resistance of the coating solution for the thermosensitive color developing layer can be evaluated by the color difference between immediately after preparing the coating solution and after elapse of a time (ΔE*); it is desirable that ΔE* be minimized, with particular preference given to a ΔE* of 2 or less. Here, the color difference between just after preparing the coating solution and after elapse of a time (ΔE*) can be determined by calculating the square root of the value obtained by adding the squares of the differences in L*, a* and b* between just after preparing the coating solution and after elapse of the time. For example, if the measured values immediately after preparing the coating solution are written L1*, a1*, and b1*, and the measured values after elapse of 24 hours after preparing the coating solution are written L2*, a2*, and b2*, the color difference can be determined by $\Delta E^*=\{(L2^*-L1^*)^2+(a2^*-a1^*)^2+(b2^*-b1^*)^2\}^{1/2}$.

In the present invention, moreover, the difference in the whiteness between immediately after preparation of a coating solution for a thermosensitive color developing layer and after elapse of a time (ΔW) is desirably as small as possible. ΔW is preferably not more than 5, more preferably not more than 3, particularly preferably not more than 2.

The thermal recording material of the present invention has a basic constitution comprising a support, and a thermosensitive color developing layer formed on the support. It is possible to further form a functional layer other than the thermosensitive color developing layer. Such functional layer is explained below.

<Protection Layer>

In the thermal recording material of the present invention, from the viewpoint of print portion plasticizer resistance, oil resistance, heat resistance, color fastness to light, water resistance, moisture resistance, print runnability and the like, it is preferable that a protective layer based mainly on a macromolecular substance be provided on the thermosensitive color developing layer; as such macromolecular substances, the wide variety of macromolecular substances mentioned above to exemplify the "binder" are applicable. Usually, it is preferable to provide a protective layer based mainly on a water-soluble macromolecular substance such as a polyvinyl alcohol macromolecular substance or starch, and further comprising a pigment and/or a lubricant.

In the thermal recording material of the present invention, in particular, from the viewpoint of heat resistance, water resistance, and moisture resistance, preference is given to an embodiment wherein a carboxyl group-containing resin such as carboxy-modified polyvinyl alcohol is used as the macromolecular substance, and an epichlorohydrin resin and a polyamine resin/polyamide resin are further used. This is presumably rationalized as follows:

First, a crosslinking reaction (first water-resisting treatment) occurs between the carboxyl group of the carboxyl group-containing resin and the amine moiety or amide moiety of the epichlorohydrin resin, which is a crosslinking agent. Next, the crosslinked moiety, which is hydrophilic, formed by the carboxyl group-containing resin and the epichlorohydrin resin, and the hydrophilic moiety of the polyamine resin/polyamide resin attract each other, so that this crosslinked moiety assumes a state wrapped with the hydrophobic group of the polyamine resin/polyamide resin outside, that is, a state wherein the crosslinked moiety, which is hydrophilic, is protected against water by the hydrophobic group (second water-resisting treatment). Hence, higher hydrophobicity is conferred to the reaction site of the resin and crosslinking agent used in the protective layer, whereby good water resistance and moisture resistance are obtained.

It is thought that when the carboxyl group-containing resin is a carboxy-modified polyvinyl alcohol, in particular, the polyamine resin/polyamide resin and the hydrophilic moiety of the carboxy-modified polyvinyl alcohol are attracted, making the carboxy-modified polyvinyl alcohol in a state wrapped with the hydrophobic group of the polyamine/polyamide resin outside, and making the cationic site of the polyamine resin/polyamide resin involved in a crosslinking reaction with the carboxyl group of the carboxy-modified polyvinyl alcohol, whereby the high water resistance is manifested and the heat resistance improves.

The thermal recording material has a three-dimensional structure as a result of the crosslinking reaction between the carboxy-modified polyvinyl alcohol and the epichlorohydrin resin, and when it comprises a pigment contained in the protective layer, it is thought that the cationic polyamine resin/polyamide resin exhibits a dispersing effect on the anionic pigment, so that the protective layer becomes a porous layer compared with the conventional art. For this reason, molten products of materials of low heat resistance get adsorbed to the pores in the protective layer, so that excellent print runnability (anti-head-dust property, anti-sticking property) can also be manifested.

Therefore, it is desirable that an epichlorohydrin resin and a polyamine resin/polyamide resin be used in combination in the protective layer of the present invention. If each is used alone, no satisfactory water resistance could be obtained and, in addition, drawbacks such as blocking could occur. If using an epichlorohydrin resin or polyamine resin/polyamide resin in combination with another ordinary crosslinking agent, for example, glyoxal, no sufficient water resistance could be obtained.

The carboxyl group-containing resin is not particularly limited as long as it is a resin having a carboxyl group. Examples thereof include resins containing a monofunctional acrylic monomer having a carboxyl group, such as methacrylic acid, 2-hydroxyethyl methacrylate, 2-hydroxypropyl methacrylate, dimethylaminoethyl methacrylate, diethylaminoethyl methacrylate, tertiary butylaminoethyl methacrylate, glycidyl methacrylate, tetrahydrofurfuryl methacrylate and the like, oxidized starch, carboxymethylcellulose and carboxyl group-modified polyvinyl alcohols wherein a carboxyl group has been introduced into polyvinyl alcohol, and the like. Particularly, carboxyl group-modified polyvinyl alcohol superior in the heat resistance and solvent resistance is preferably used.

In the carboxyl group-modified polyvinyl alcohol, a carboxyl group has been introduced to enhance reactivity of polyvinyl alcohol. It is obtained as reaction products of polyvinyl alcohol and polyvalent carboxylic acid or anhydride thereof, such as fumaric acid, phthalic anhydride, anhydrous mellitic acid, itaconic anhydride and the like, or esters of such reaction products, or a saponification product of a copolymer of vinyl acetate and ethylenic unsaturated group-containing mono- or di-carboxylic acid, such as maleic acid, fumaric acid, itaconic acid, crotonic acid, acrylic acid, methacrylic acid and the like. Specifically, for example, the production method described in JP-A-S53-91995 and the like can be mentioned.

Specific examples of the epichlorohydrin resin include polyamide epichlorohydrin resin, polyamine epichlorohydrin resin and the like. Any one of these may be used alone or used in combination. As amine, which is present in the main chain of epichlorohydrin resin, the primary to quaternary amines can be used, and is not particularly limited. To achieve good water resistance, moreover, the degree of cationization and molecular weight are preferably not more than 5 meq/g·Solid (measured at pH 7) and not less than 500,000, respectively. Specific examples include Sumirez resin 650(30), Sumirez resin 675A, Sumirez resin 6615 (all manufactured by Sumitomo Chemical Co., Ltd.), WS4002, WS4020, WS4024, WS4030, WS4046, WS4010, CP8970 (all manufactured by SEIKO PMC CORPORATION) and the like.

In the present invention, the “polyamine resin/polyamide resin” means polyamine resin and/or polyamide resin, or polyaminepolyamide resin. The polyamine resin/polyamide resin includes, for example, polyamide resin, polyamine resin, polyamideurea resin, polyethyleneimine resin, polyalkylenepolyamine resin, polyalkylenepolyamide resin, polyamine polyurea resin, modified polyamine resin, modified polyamide resin, polyalkylenepolyamineurea formalin resin, polyalkylenepolyaminepolyamide polyurea resin and the like. One or more kinds of these can be used. Specific examples include, Sumirez resin 302 (manufactured by Sumitomo Chemical Co., Ltd.: polyamine polyurea resin), Sumirez resin 712 (manufactured by Sumitomo Chemical Co., Ltd.: polyamine polyurea resin), Sumirez resin 703 (manufactured by Sumitomo Chemical Co., Ltd.: polyamine polyurea resin), Sumirez resin 636 (manufactured by Sumitomo Chemical Co., Ltd.: polyamine polyurea resin), Sumirez resin SPI-100 (manufactured by Sumitomo Chemical Co., Ltd.: modified polyamine resin), Sumirez resin SPI-102A (manufactured by Sumitomo Chemical Co., Ltd.: modified polyamine resin), Sumirez resin SPI-106N (manufactured by Sumitomo Chemical Co., Ltd.: modified polyamide resin), Sumirez resin SPI-203(50) (manufactured by Sumitomo Chemical Co., Ltd.: polyamide resin), Sumirez resin SPI-198 (manufactured by Sumitomo Chemical Co., Ltd.: polyamide resin), Printive A-700 (manufactured by Asahi Kasei Corporation), Printive A-600 (manufactured by Asahi Kasei Corporation), PA6500 (manufactured by SEIKO PMC CORPORATION: polyalkylenepolyamineurea formalin resin), PA6504 (manufactured by SEIKO PMC CORPORATION: polyalkylenepolyamineurea formalin resin), PA6634, PA6638, PA6640, PA6644, PA6646, PA6654, PA6702, PA6704 (all manufactured by SEIKO PMC CORPORATION: polyalkylenepolyaminepolyamide polyurea resin), CP8994 (manufactured by SEIKO PMC CORPORATION: polyethyleneimine resin) and the like. At least a polyamine resin or a polyaminepolyamide resin (polyalkylenepolyamine resin, polyamine polyurea resin, modified polyamine resin, polyalkylenepolyamineurea formalin resin, and polyalkylenepolyaminepolyamide polyurea resin etc.) is desirably used, though without a particular limitation, from the aspect of color developing sensitivity.

The content of the epichlorohydrin resin and the polyamine resin/polyamide resin in the protection layer is each preferably 1 part by weight-100 parts by weight, more preferably 5 parts by weight-50 parts by weight, per 100 parts by weight of the carboxyl group-containing resin such as carboxyl group-modified polyvinyl alcohol and the like. When the content is too small, the crosslinking reaction becomes insufficient and good water resistance cannot be achieved. When it is too high, operational problems occur, such as increased viscosity of coating solution and gel formation. Since a crosslinking reaction occurs in epichlorohydrin resin at pH 6.0 or above, the pH of the coating solution for protection layer to be used for the formation of a protection layer is desirably adjusted to not less than 6.0.

In the present invention, the protection layer preferably contains a pigment. As the pigment, those exemplified as the pigment for the aforementioned thermosensitive color developing layer can be used. Such pigments can be used alone, or used as a mixture of two or more kinds thereof. The content of the pigment and macromolecular substance in the protection layer is preferably about 30 parts by weight-300 parts by weight of the macromolecular substance (solid content) per 100 parts by weight of the pigment.

In addition, the protection layer may contain components other than those mentioned above, such as lubricant etc., as necessary. The types and amount of such component can be determined according to the desired property and recording properties.

The amount of the protection layer to be applied (dry weight of coating film) can be appropriately determined according to its composition, use of the thermal recording material and the like. It is generally preferably about 1 $g/m^2$-5 $g/m^2$.

<Other Layers>

In the thermal recording material of the present invention, for the purpose of further increasing the color-developing sensitivity, an undercoat comprising a pigment, a macromolecular substance and the like may be formed under the thermosensitive color developing layer. It is also possible to provide a back coat layer on the face opposite to the thermosensitive color developing layer of the support to achieve curl corrections. An intermediate layer (heat insulating layer) may be formed between the support and the thermosensitive color developing layer, between the thermosensitive color developing layer and the protective layer, and between the support and the back layer. When the thermal recording material of the present invention is prepared as having a protective layer and an undercoat, these functional layers, other than the thermosensitive color developing layer, can be formed in the same manner as the above-described method of forming a thermosensitive color developing layer. Specifically, a dispersion of the material constituting the functional layer is prepared, the dispersion is applied as the coating solution to form a coating film, and the coating film is dried. Various techniques publicly known in the field of thermal recording materials, such as performing a smoothing treatment using a supercalender and the like after applying each layer, may be added as appropriate if required.

<Thermal Recording Material>

The thermal recording material of the present invention is a thermal recording material having at least a support and a thermosensitive color developing layer provided on the support, wherein the layer comprises a colorless or pale-colored electron-donating leuco dye, an electron-accepting developer and a hindered phenol compound, preferably having a protective layer on the thermal recording layer. An undercoat and an intermediate layer may be present as required.

The thermal recording material of the present invention is free of greenish color development and has a color with no feeling of difference for a white color, even though a diphenylsulfone derivative represented by the above-mentioned formula (1) is used as a developer.

EXAMPLES

The present invention is explained in the following by way of Examples. The present invention is not limited by the Examples as long as it does not depart from the scope of the invention.

In the following Examples and Comparative Examples, an under layer, a thermosensitive color developing layer (recording layer) and, where necessary, a protection layer were formed on one surface of a support. In the explanation, parts and % mean parts by weight and wt %, respectively.

Coating solutions used for each coating layer of a thermal recording material were prepared as follows.

<Coating Solution for Thermosensitive Color Developing Layer>

The following solutions A-D were separately subjected to wet grinding by a sand grinder until the average particle size of the solid material in the liquid became about 0.5 μm.

The average particle size is a volume average particle size (D50) in number base distribution measured by a laser diffraction scattering type particle size analyzer, Microtrack MT3000 (manufactured by NIKKISO CO., LTD.).

Solution A (Hindered Phenol Compound Dispersion)

| | |
|---|---|
| 1,1,3-tris(2-methyl-4-hydroxy-5-t-butylphenyl)butane <manufactured by OSAKA SHINYAKU CO., LTD., trade name: OS-930, molecular weight 545, melting point not less than 185° C.> | 6.0 parts |
| polyvinyl alcohol <manufactured by The Nippon Synthetic Chemical Industry Co., Ltd., trade name: GOHSERAN L-3266> 10% aqueous solution | 5.0 parts |
| water | 1.5 parts |

The above-mentioned 1,1,3-tris(2-methyl-4-hydroxy-5-t-butylphenyl)butane<manufactured by OSAKA SHINYAKU CO., LTD., trade name: OS-930> shows a maximum diffracted X-ray peak at a diffraction angle (2θ)=6.5°, a second maximum diffracted X-ray peak at a diffraction angle (2θ)=13.1°, a third maximum diffracted X-ray peak at a diffraction angle (2θ)=19.7°, in X-ray diffraction measurement using CuKα ray as an X-ray source (see FIG. 1).

The above-mentioned OS-930 (trade name) is a crystal having a water content of 6% (hereinafter to be referred to as crystal A).

The aforementioned melting point (not less than 185° C.) of the above-mentioned OS-930 (trade name) was measured after heating at normal pressure, 130° C. for 1 hr. When the melting point of the above-mentioned OS-930 (trade name) was measured according to JIS K 0064, it was found to be 123° C.

The X-ray diffraction was measured using an X-ray diffractometer RAD-RB manufactured by RIGAKU Corporation.

(Measurement Condition)

X-ray: CuKa1 tube voltage/tube current: 40 kv/40 Ma divergence slit: 1/2 deg scattering slit: 1/2 deg receiving slit: 0.3 mm scan mode: continuous scan speed: 4 deg/min scan step: 0.02 deg scan axis: 2θ/θ scan field: 2 deg-60 deg

Solution B (Developer Dispersion)

| | |
|---|---|
| 1-[4-(4-hydroxyphenylsulfonyl)phenoxy]-4-[4-(4-isopropoxyphenylsulfonyl)phenoxy]butane <compound synthesized by the method described in JP-A-2003-212841, and represented by the following formula> | 6.0 parts |
| polyvinyl alcohol <manufactured by The Nippon Synthetic Chemical Industry Co., Ltd., trade name: GOHSERAN L-3266> 10% aqueous solution | 5.0 parts |
| water | 1.5 parts |

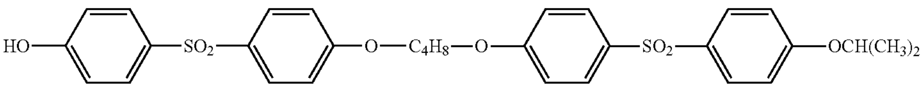

Solution C (Basic Colorless Dye Dispersion)

| | |
|---|---|
| 3-dibutylamino-6-methyl-7-anilinofluoran <manufactured by YAMAMOTO CHEMICALS Inc., trade name: ODB-2) | 6.0 parts |
| polyvinyl alcohol <manufactured by The Nippon Synthetic Chemical Industry Co., Ltd., trade name: GOHSERAN L-3266> 10% aqueous solution | 5.0 parts |
| water | 1.5 parts |

Solution D (Sensitizer Dispersion),

| | |
|---|---|
| β-benzyloxynaphthalene <manufactured by UENO FINE CHEMICALS INDUSTRY, LTD.> | 6.0 parts |
| polyvinyl alcohol <manufactured by The Nippon Synthetic Chemical Industry Co., Ltd., trade name: GOHSERAN L-3266> 10% aqueous solution | 5.0 parts |
| water | 1.5 parts |

<Coating Solution for Undercoating Layer>

| | |
|---|---|
| calcined kaolin <manufactured by BASF, trade name: Ansilex 90> | 90.0 parts |
| styrene-butadiene copolymer latex (solid content 50%) | 10.0 parts |
| water | 50.0 parts |

The above-mentioned materials were mixed and stirred to give a coating solution for undercoating layer.

<Coating Solution for Protection Layer>

| | |
|---|---|
| aluminum hydroxide 50% dispersion <manufactured by Martinswerg, trade name: Martifin OL> | 9.0 parts |
| carboxyl-modified polyvinyl alcohol <manufactured by KURARAY CO., LTD., trade name: KL118, degree of polymerization: about 1700, degree of saponification: 95 mol %-99 mol %> 10% aqueous solution | 30.0 parts |
| polyamide epichlorohydrin resin <manufactured by SEIKO PMC CORPORATION, trade name: WS4030, solid content 25%, degree of cationization: 2.7, molecular weight: 2,200,000, quaternary amine> | 4.0 parts |
| modified polyamine resin <manufactured by Sumitomo Chemical Co., Ltd., trade name: Sumirez resin SPI-102A, solid content 45%> | 2.2 parts |
| zinc stearate <manufactured by Tyukyo Yushi CO., LTD., trade name: Hydrin Z-7-30, solid content 30%> | 2.0 parts |

The above-mentioned materials were mixed and stirred to give a coating solution for protection layer.

Example 1

Respective dispersions were mixed at the following ratio to give a coating solution for a thermosensitive color developing layer.

| | |
|---|---|
| solution A (hindered phenol compound dispersion) | 1.8 parts |
| solution B (developer dispersion) | 16.2 parts |
| solution C (basic colorless dye dispersion) | 18.0 parts |
| solution D (sensitizer dispersion) | 36.0 parts |
| silica <manufactured by Mizusawa Industrial Chemicals, LTD., trade name: P537 25% dispersion> | 17.5 parts |
| polyvinyl alcohol <manufactured by The Nippon Synthetic Chemical Industry Co., Ltd., trade name: GOHSERAN L-3266> 10% solution | 25.0 parts |

The coating solution was preserved at 22° C.-23° C. After 24 hr, the color tone (L*a*b*) was measured using a spectral colorimeter SE-2000 manufactured by NIPPON DENSYOKU INDUSTRIES, CO., LTD. and according to JIS Z 8729 under the conditions of reflection method, light source: D65, field of view: 2 degrees. In addition, whiteness W was also measured according to JIS Z 8715. The results are shown in Table 1.

In the L*a*b* color system, the lightness is shown by L*, and chromaticity showing hue and chroma is shown by a*, b*. The a*, b* shows the color direction, wherein a* in the plus value shows red direction, and minus value shows green direction, and b* in the plus value shows yellow direction, and minus value shows blue direction.

Example 2

In the same manner as in Example 1 except that the amount of solution A was changed to 3.6 parts and the amount of solution B was changed to 14.4 parts in the coating solution of Example 1, a coating solution for a thermosensitive color developing layer was prepared, and the color tone (L*a*b*) and whiteness W were measured. The results thereof are shown in Table 1.

Example 3

In the same manner as in Example 1 except that the amount of solution A was changed to 5.4 parts and the amount of solution B was changed to 12.6 parts in the coating solution of Example 1, a coating solution for a thermosensitive color developing layer was prepared, and the color tone (L*a*b*) and whiteness W were measured. The results thereof are shown in Table 1.

Example 4

In the same manner as in Example 1 except that the amount of solution A was changed to 0.9 parts and the amount of solution B was changed to 18.0 parts in the coating solution of Example 1, a coating solution for a thermosensitive color developing layer was prepared, and the color tone (L*a*b*) and whiteness W were measured. The results thereof are shown in Table 1.

Example 5

In the same manner as in Example 1 except that the amount of solution A was changed to 1.8 parts and the amount of solution B was changed to 18.0 parts in the coating solution of Example 1, a coating solution for a thermosensitive color developing layer was prepared, and the color tone (L*a*b*) and whiteness W were measured. The results thereof are shown in Table 1.

Example 6

In the same manner as in Example 1 except that the amount of solution A was changed to 9.0 parts and the amount of solution B was changed to 18.0 parts in the coating solution of Example 1, a coating solution for a thermosensitive color developing layer was prepared, and the color tone (L*a*b*) and whiteness W were measured. The results thereof are shown in Table 1.

Example 7

In the same manner as in Example 5 except that benzyloxynaphthalene in solution D was changed to 1,2-di-(3-methylphenoxy)ethane (manufactured by SANKO CO., LTD., trade name: KS232) in the coating solution of Example 5, a coating solution for a thermosensitive color developing layer was prepared, and the color tone (L*a*b*) and whiteness W were measured. The results thereof are shown in Table 1.

Example 8

In the same manner as in Example 5 except that solution A was changed to a dispersion of a hindered phenol compound having an average particle size (D50) of 0.2 μm, in the coating solution of Example 5, a coating solution for a thermosensitive color developing layer was prepared, and the color tone (L*a*b*) and whiteness W were measured. The results thereof are shown in Table 1.

In addition, the color tone (L*a*b*) and whiteness W of the coating solution for a thermosensitive color developing layer after lapse of 24 hr from the preparation of the coating solution were measured, and the color difference (ΔE*) and the difference in the whiteness (ΔW) between immediately after preparation and 24 hr later was determined. As a result, the color difference (ΔE*) was 0.59, and the difference in the whiteness (ΔW) was 1.0.

Example 9

In the same manner as in Example 8 except that solution B was changed to a dispersion of a developer having an average particle size of 0.9 μm, and solution B was heated at 60° C. for 24 hr, in the coating solution of Example 8, a coating solution for a thermosensitive color developing layer was prepared, and the color tone (L*a*b*) and whiteness W were measured. The results thereof are shown in Table 1.

Example 10

In the same manner as in Example 9 except that the amount of solution A was changed to 0.36 parts in the coating solution of Example 9, a coating solution for a thermosensitive color developing layer was prepared, and the color tone (L*a*b*) and whiteness W were measured. The results thereof are shown in Table 1.

Example 11

Amorphous 1,1,3-tris(2-methyl-4-hydroxy-5-t-butylphenyl)butane (hereinafter to be referred to as crystal B) was produced by the following method.

Figure 2:
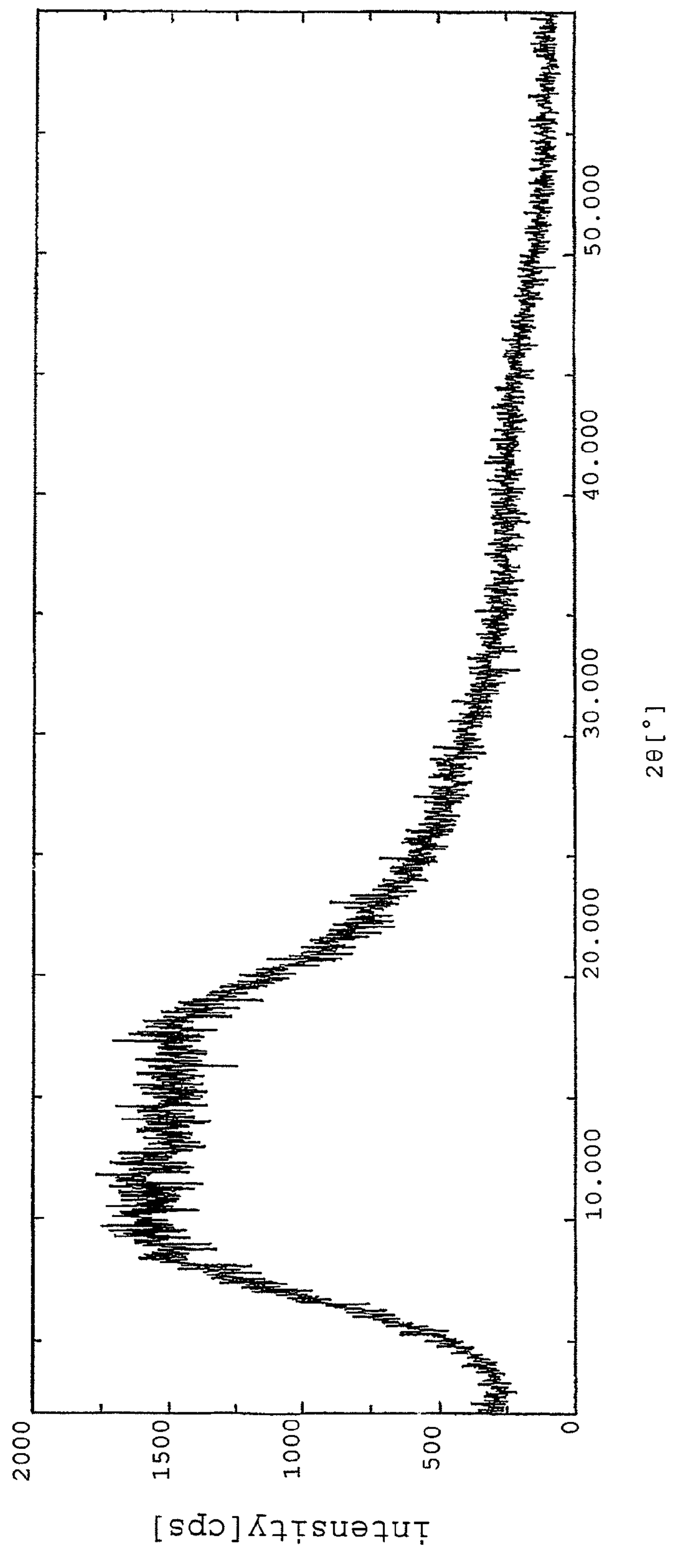
FIG. 2 is an X-ray diffraction chart, using CuKα ray as an X-ray source, of amorphous 1,1,3-tris(2-methyl-4-hydroxy-5-t-butylphenyl)butane used in Example 11.

Under a nitrogen atmosphere, 1,1,3-tris(2-methyl-4-hydroxy-5-t-butylphenyl)butane <manufactured by ADEKA CORPORATION, trade name: AO-30> (35 g, 64.2 mmol) was melted in a 200 mL four-necked kolben at 200° C., and rapidly cooled to give amorphous 1,1,3-tris(2-methyl-4-hydroxy-5-t-butylphenyl)butane (32 g, 58.7 mmol). The property of the obtained compound was confirmed by X-ray diffraction measurement and confirmed to be amorphous) (see FIG. 2). Water was not detected in the obtained compound.

In the same manner as in Example 5 except that 1,1,3-tris(2-methyl-4-hydroxy-5-t-butylphenyl)butane in solution A was changed to crystal B, in the coating solution of Example 5, a coating solution for a thermosensitive color developing layer was prepared, and the color tone (L*a*b*) and whiteness W were measured. The results thereof are shown in Table 1.

Comparative Example 1

In the same manner as in Example 1 except that 1,1,3-tris(2-methyl-4-hydroxy-5-t-butylphenyl)butane in solution A was changed to water, a coating solution for a thermosensitive color developing layer was prepared, and the color tone (L*a*b*) and whiteness W were measured. The results thereof are shown in Table 1. The obtained coating solution was colored in green and the whiteness thereof also decreased.

In addition, the color tone (L*a*b*) and whiteness W of the coating solution for a thermosensitive color developing layer after lapse of 24 hr from the preparation of the coating solution were measured, and the color difference (ΔE*) and the difference in the whiteness (ΔW) between immediately after preparation and 24 hr later was determined. As a result, the color difference (ΔE*) was 9.14, and the difference in the whiteness (ΔW) was 14.2.

Example 12

In the same manner as in Example 5 except that 1,1,3-tris(2-methyl-4-hydroxy-5-t-butylphenyl)butane in solution A was changed to AO-30 (manufactured by ADEKA CORPORATION), a coating solution for a thermosensitive color developing layer was prepared, and the color tone (L*a*b*) and whiteness W were measured. The results thereof are shown in Table 1.

Figure 3:
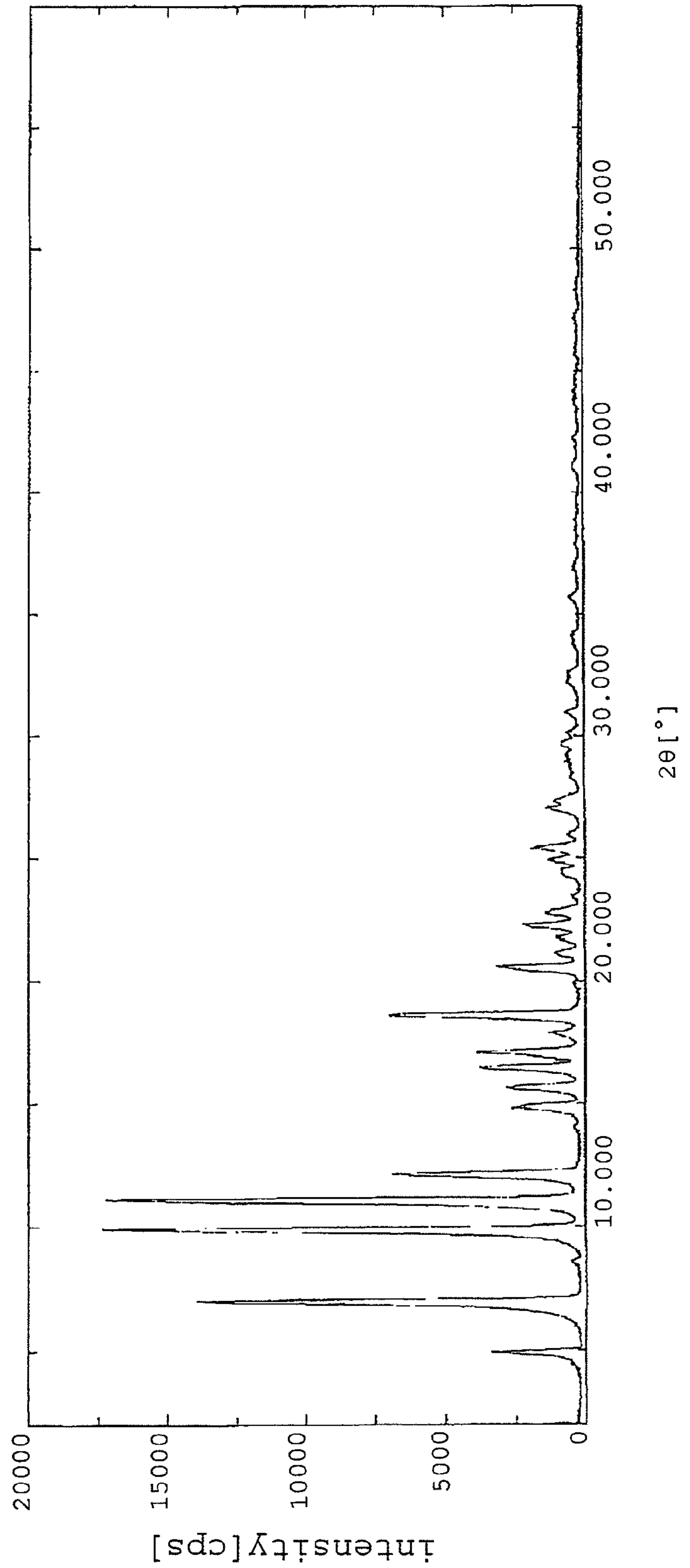
FIG. 3 is an X-ray diffraction chart, using CuKα ray as an X-ray source, of 1,1,3-tris(2-methyl-4-hydroxy-5-t-butylphenyl)butane <manufactured by ADEKA CORPORATION, trade name: AO-30> used in Example 12.

Unlike the above-mentioned crystal A and crystal B, AO-30 (manufactured by ADEKA CORPORATION) showed strong peaks at diffraction angles (2θ)=6.9°, 9.7° and 11.1° in X-ray diffraction measurement using CuKα ray as an X-ray source (measurement conditions were the same as in the above) (see FIG. 3). Water was not detected in the obtained compound (hereinafter to be referred to as crystal C). The melting point was measured according to JIS K 0064. As a result, melting point was 185° C.

Comparative Example 2

In the same manner as in Example 4 except that the average particle size of solution A was changed to 0.9 μm, a coating solution for a thermosensitive color developing layer was prepared, and the color tone (L*a*b*) and whiteness W were measured. The results thereof are shown in Table 1. The obtained coating solution was somewhat colored in green and the whiteness thereof decreased.

Example 13

In the same manner as in Example 4 except that the average particle size of solution B was changed to 0.3 μm, a coating solution for a thermosensitive color developing layer was prepared, and the color tone (L*a*b*) and whiteness W were measured. The results thereof are shown in Table 1.

TABLE 1

| | L* | a* | b* | W |
|---|---|---|---|---|
| Example 1 | 88.8 | −2.5 | 0.5 | 71.2 |
| Example 2 | 90.1 | −1.8 | 0.9 | 72.5 |
| Example 3 | 90.4 | −1.7 | 1.1 | 71.8 |
| Example 4 | 86.5 | −3.4 | 0.3 | 67.4 |
| Example 5 | 89.2 | −2.3 | 0.6 | 71.8 |
| Example 6 | 90.7 | −1.3 | 1.5 | 70.6 |
| Example 7 | 86.2 | −3.1 | 0.1 | 67.9 |
| Example 8 | 89.1 | −1.7 | 0.8 | 70.3 |
| Example 9 | 89.1 | −1.4 | 0.9 | 70.0 |
| Example 10 | 86.4 | −2.7 | 0.7 | 65.5 |
| Example 11 | 87.3 | −2.2 | 0.6 | 68.3 |
| Comparative Example 1 | 83.5 | −4.6 | 0.2 | 61.9 |

TABLE 1-continued

| | L* | a* | b* | W |
|---|---|---|---|---|
| Example 12 | 85.0 | −3.5 | 0.6 | 64.6 |
| Comparative Example 2 | 82.5 | −4.1 | 0.4 | 59.7 |
| Example 13 | 84.2 | −3.6 | 0.5 | 62.0 |

Example 14

A coating solution for an undercoating layer was applied to one surface of wood free paper (47 $g/m^2$ substrate paper) with a Mayer bar such that the coating amount would be 10.0 $g/m^2$ in dry weight and dried (forced air dryer, 60° C., 2 min) to give undercoated paper. The undercoating layer of the undercoated paper was coated with the coating solution for a thermosensitive color developing layer, which was prepared in Example 1, such that the coating amount would be 6.0 $g/m^2$ in dry weight and dried (forced air dryer, 60° C., 2 min). The obtained sheet was treated with a super calendar to achieve a degree of smoothness of 500 sec-1000 sec to give a thermal recording material. The obtained thermal recording material was free of green coloration and caused no feeling of difference for a white color.

Example 15

In the same manner as in Example 14 except that the coating solution for the thermosensitive color developing layer was changed to the coating solution for the thermosensitive color developing layer prepared in Example 2, a thermal recording medium material was prepared. The obtained thermal recording material was free of green coloration and caused no feeling of difference for a white color.

Example 16

In the same manner as in Example 14 except that the coating solution for the thermosensitive color developing layer was changed to the coating solution for the thermosensitive color developing layer prepared in Example 3, a thermal recording medium material was prepared. The obtained thermal recording material was free of green coloration and caused no feeling of difference for a white color.

Comparative Example 3

In the same manner as in Example 14 except that the coating solution for the thermosensitive color developing layer was changed to the coating solution for the thermosensitive color developing layer prepared in Comparative Example 1, a thermal recording medium material was prepared. The obtained thermal recording material was colored in green and the lightness decreased.

TABLE 2

| | L* | a* | b* |
|---|---|---|---|
| Example 14 | 91.5 | −0.7 | −0.1 |
| Example 15 | 91.9 | −0.5 | −0.1 |
| Example 16 | 91.9 | −0.5 | −0.2 |
| Comparative Example 3 | 90.4 | −1.5 | 0.5 |

INDUSTRIAL APPLICABILITY

The thermal recording material of the present invention can also be used as an output medium of facsimile, computer printer, automatic ticket vending machine, measurement recorder, handy terminal used outdoor and the like.

This application is based on a patent application No. 2009-91569 filed in Japan, the contents of which are incorporated in full herein.

The invention claimed is:

1. A coating solution for a thermosensitive color developing layer, which comprises a colorless or pale-colored electron-donating leuco dye, a hindered phenol compound and, as an electron-accepting developer, a diphenylsulfone derivative represented by the following formula (1):

(1)

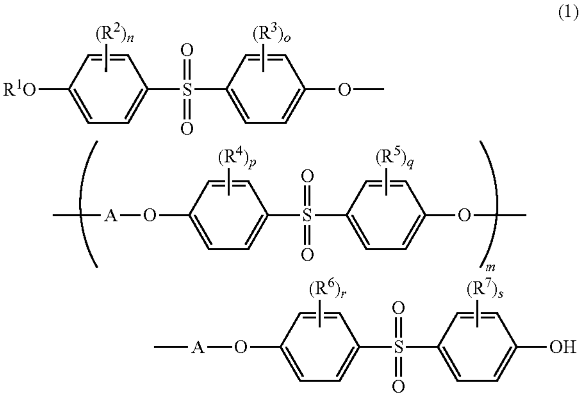

wherein $R^1$ is a linear or branched, saturated or unsaturated hydrocarbon group having a carbon number of 1-12, $R^2$-$R^7$ are each independently a halogen atom, or an alkyl group or alkenyl group having a carbon number of 1-12, n, o, p, q, r and s are each an integer of 0 -4, m is an integer of 0-5, and each A is independently a linear or branched, saturated or unsaturated hydrocarbon group having a carbon number of 1-12 and optionally having an ether bond, wherein the aforementioned hindered phenol compound has an average particle size (D50) of not more than 0.5 μm, and the coating solution has a color tone a* of not less than −4.0 as measured according to JIS Z 8729 and a whiteness W of not less than 62 as measured according to JIS Z 8715.

2. The coating solution according to claim 1, wherein the hindered phenol compound is a 1,1,3-tris-substituted butane compound represented by the following formula (2):

(2)

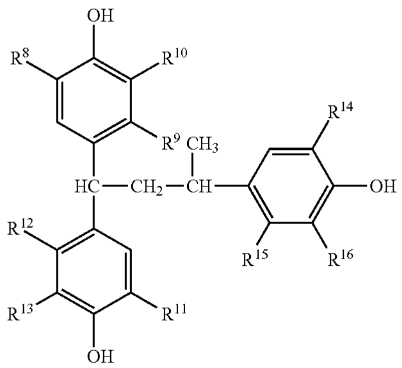

wherein $R^8$, $R^{11}$ and $R^{14}$ are each independently an alkyl group having a carbon number of 1-8, and $R^9$, $R^{10}$, $R^{12}$, $R^{13}$, $R^{15}$ and $R^{16}$ are each independently a hydrogen atom or an alkyl group having a carbon number of 1-8.

3. The coating solution according to claim 2, wherein, in the aforementioned formula (2), $R^8$, $R^{11}$ and $R^{14}$ are tert-butyl groups, $R^9$, $R^{12}$ and $R^{15}$ are methyl groups, and $R^{10}$, $R^{13}$ and $R^{16}$ are hydrogen atoms.

4. The coating solution according to claim 2, wherein the aforementioned 1,1,3-tris-substituted butane compound of the formula (2) has a crystal structure showing the maximum diffracted X-ray peak within the range of diffraction angle (2θ)=6.4°-6.6°, a second maximum diffracted X-ray peak within the range of one of (2θ)=13.0°-13.2° and (2θ)=19.6°-19.8°, and a third maximum diffracted X-ray peak within the other range, in an X-ray diffraction measurement using CuKαray as an X-ray source.

5. The coating solution according to claim 2, wherein the aforementioned 1,1,3-tris-substituted butane compound of the formula (2) is an amorphous hindered phenol compound.

6. The coating solution according to claim 1, wherein the content of the hindered phenol compound is 0.01 part by weight-10 parts by weight, per 1 part by weight of the diphenylsulfone derivative represented by the formula (1).

7. The coating solution according to claim 1, wherein the aforementioned diphenylsulfone derivative represented by the formula (1) has an average particle size of 0.5 μm-5 μm.

8. The coating solution according to claim 1, which is prepared using a dispersion obtained by heating a dispersion containing the aforementioned diphenylsulfone derivative represented by the formula (1) at 40° C.-80° C. for 6 hr-72 hr.

9. A thermal recording material comprising a support and a thermosensitive color developing layer formed thereon, wherein the thermosensitive color developing layer is formed with the coating solution according to claim 1.

10. The thermal recording material according to claim 9, further comprising a protection layer comprising carboxy-modified polyvinyl alcohol, epichlorohydrin resin and polyamine resin/polyamide resin on the thermosensitive color developing layer.

* * * * *